US006941076B1

(12) United States Patent
Adams et al.

(10) Patent No.: US 6,941,076 B1
(45) Date of Patent: Sep. 6, 2005

(54) TONE MODULATION FOR OUT-OF-BAND COMMUNICATION IN A FREE-SPACE OPTICAL COMMUNICATION LINK

(75) Inventors: Jeffrey C. Adams, Seattle, WA (US); Rand W. Lee, Kirkland, WA (US)

(73) Assignee: Terabeam Corporation, Falls Church, VA (US)

( * ) Notice: Subject to any disclaimer, the term of this patent is extended or adjusted under 35 U.S.C. 154(b) by 475 days.

(21) Appl. No.: 09/859,339

(22) Filed: May 16, 2001

(51) Int. Cl.[7] ........................ H04B 10/00; H04B 10/04; H04B 10/12

(52) U.S. Cl. ........................ 398/130; 398/183; 398/185; 398/118

(58) Field of Search ........................ 398/118, 124, 125, 398/130, 131, 128, 129, 172, 183, 185; 332/108, 332/119, 145, 151; 370/204; 455/45; 375/269

(56) References Cited

U.S. PATENT DOCUMENTS 4,633,315 A 12/1986 Kasperkovitz
5,062,150 A 10/1991 Swanson et al.
5,539,557 A 7/1996 Horiuchi et al.
5,710,652 A 1/1998 Bloom et al.
5,777,768 A 7/1998 Korevaar
5,790,291 A 8/1998 Britz
6,025,948 A 2/2000 Gautheron
6,091,528 A 7/2000 Kanda
6,097,522 A 8/2000 Maerki et al.
6,122,084 A * 9/2000 Britz et al. ................. 398/131
6,219,133 B1 4/2001 Kawase et al.
6,271,953 B1 8/2001 Dishman et al.
6,373,611 B1 * 4/2002 Farhan et al. ............... 398/182
6,469,815 B1 * 10/2002 Poon et al. ................. 398/131
6,473,213 B1 * 10/2002 Wandernoth et al. ....... 398/129
6,483,621 B1 * 11/2002 Adams et al. .............. 398/130
6,616,352 B1 * 9/2003 Shigeta et al. ............. 398/156

* cited by examiner

*Primary Examiner*—Jason Chan
*Assistant Examiner*—Nathan Curs
(74) *Attorney, Agent, or Firm*—Blakely Sokoloff Taylor & Zafman LLP

(57) ABSTRACT

Systems and methods for the transmission of auxiliary data via a modulated carrier signal superimposed on a primary data communication signal between terminals of a free-space optical communication system are disclosed. The carrier signal is modulated with an auxiliary data signal via phase-shift keying, amplitude-shift keying, frequency-shift keying, or other suitable modulation technique, and superimposed on the primary data communication signal prior to transmission as an optical signal by a transmitting free-space optical terminal. The primary data communication signal is received by at least one photo detector coupled to a receiving free-space optical terminal that demodulates the primary data communication signal to reconstruct the auxiliary data.

32 Claims, 4 Drawing Sheets

TONE MODULATION FOR OUT-OF-BAND COMMUNICATION IN A FREE-SPACE OPTICAL COMMUNICATION LINK

TECHNICAL FIELD

This disclosure relates to free-space optical communication systems, and more particularly, but not exclusively, to apparatus and methods of conveying auxiliary information between two free-space optical terminals by utilizing modulation of an auxiliary carrier tone superimposed on a data communication signal.

BACKGROUND

With the increasing popularity of wide area networks, such as the Internet and/or the World Wide Web, network growth and traffic have exploded in recent years. Network users continue to demand faster networks, and as network demands continue to increase, existing network infrastructures and technologies are reaching their limits.

An alternative to existing hardwire or fiber network solutions, which suffer from limited capacity or exponentially increasing construction costs in "the last mile" of the communication system, is the use of wireless optical telecommunications technology. Wireless optical telecommunications utilize beams of light, such as lasers, as optical communication signals, and therefore do not require the routing of cables or fibers between locations. Data, or other information, is encoded into a beam of light, and then transmitted through free space from a transmitter to a receiver.

For point-to-point free-space laser communications, the use of narrow optical beams provides several advantages, including data security, high customer density, and high directivity. High directivity makes the achievement of high data rates and high link availability easier, due to higher signal levels at a receiver. In order to take full advantage of this directivity, some form of tracking is often necessary to keep the antennas of a transmitter and of the receiver properly pointed at one another. For example, a transmitted optical beam with a 1-mrad divergence has a spot diameter at the receiver of about 1 m at a 1-km range. Thus, movement of the transmitter or receiver by even a small fraction of the divergence (or field of view) could compromise the link unless some form of active tracking is employed.

Charge coupled device ("CCD") arrays or quadrant cell optical detectors (hereinafter referred to as "quad cells," or "quad cell detectors") may be used as tracking detectors in a tracking system. In either case, an electrically controllable steering mirror, gimbal, or other steering device may be used to maximize an optical signal (e.g., light) directed at a high speed detector, based on information provided by the tracking detector. This is possible since optical paths for tracking and communication are pre-aligned, and the nature of a tracking signal for a perfectly aligned signal is known. CCD tracking is very sensitive, offers potentially more immunity to solar glint because of the ability to ignore glint "features" on the CCD array, and is in general, a well-proven tracking method. However, at certain wavelengths, a lower wavelength tracking beam is often necessary due to limitations of CCD detection systems. Such separate wavelengths are typically used with their own set of transmitter optics, thereby requiring the use of additional hardware. Furthermore, designs using separate beacon and communication optical transmitters require more time in manufacturing because of the need to co-align the two optical transmitters. Such separate transmitter paths are also more susceptible to misalignments due to mechanical shock and/or thermal stresses.

In the case of quad cells, a majority of the received optical signal is typically directed to the high-speed detector for the communication channel, while a small portion (e.g., 10 percent) is split off or directed to the tracking detector. For an aligned optical system, an equal signal in all four quadrants will normally indicate that the steering mirror has optimally directed the optical communication signal onto the high speed detector, and where there is deviation from this alignment, the steering mirror will direct the optical signal back to this optimum equilibrium.

One method of signal detection via a quad cell utilizes a low frequency tone superimposed on a data communication signal which can be recovered using a variety of methods in the receive electronics. An example of such a method is described in detail in commonly assigned U.S. patent application Ser. No. 09/627,819, entitled METHOD AND APPARATUS FOR TONE TRACKING IN WIRELESS OPTICAL COMMUNICATION SYSTEMS, filed Jul. 28, 2000. This method uses a tone (e.g., 20 kHz) superimposed on a data communication signal and having a small modulation depth as compared with the primary digital or modulated data communication signal. The modulation depth of the 20 kHz tone may be as little as a few percent of the amplitude of an on-off keying ("OOK") signal used to convey digital information, so as not to adversely impact the data communication channel. The advantage of tone modulation detection is an enhanced sensitivity gained via use of a narrow-band electronic filter or lock-in detector that will eliminate wide-band electronic noise.

As an alternative to the methods described in the aforementioned commonly assigned application, or to aid in the system level pointing and tracking of a free-space optical communication link, auxiliary communication channels between the transmitter and the receiver are also advantageous. Communication of auxiliary system level information between terminals of a free-space optical network facilitates effective signal transmission by providing link status information, transmit power control information, and alignment information, including pointing, acquisition, and tracking algorithms. This auxiliary information, in one form or another, may be essential to maintaining an efficient communication link between two free-space optical terminals. In particular, the communication of power control information, based on current signal reception, will increase communication efficiency and data rates by indicating whether the strength of the received signal needs to be optimized. Similarly, the communication of auxiliary alignment information may provide better tracking coordination (e.g., using a master/slave control system), and facilitate the exchange of other system level information that is useful for the reliable operation of the free-space optical communication link.

As will be apparent to the reader, use of the primary communication channel of the free-space optical link to transmit auxiliary system communications has the disadvantage of requiring that the pointing and tracking system already be working before the primary communication channel can be used in this manner (the primary use of the auxiliary communication channel may be to assist the pointing and tracking system in order to establish a reliable communication link). Other possible auxiliary communication channels include modems, Internet links, or a radio frequency ("RF") channel. However, each of these auxiliary communication channels also contain inherent disadvantages. Use of a modem requires a telephone line, RF adds complexity and cost to the system, and an Internet connection requires that an additional back-up network be in place. As such, methods of transmitting auxiliary communications between terminals of a free-space optical communication system that can resolve the aforementioned difficulties are needed.

SUMMARY OF THE ILLUSTRATED EMBODIMENTS

An aspect of the illustrated embodiments is to provide systems and methods for the transmission of auxiliary data via a modulated carrier signal superimposed on a primary data communication signal between terminals of a free-space optical communication system. The carrier signal is modulated with an auxiliary data signal via a suitable modulation technique, and superimposed on the primary data communication signal prior to transmission as an optical signal by a transmitting free-space optical terminal. The primary data communication signal is received by at least one photo detector coupled to a receiving free-space optical terminal that demodulates the primary data communication signal to reconstruct the auxiliary data.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of a system and method for auxiliary communication between a transmitter and a receiver in a free-space optical communication system are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide systems and methods for the transmission of auxiliary communication data via a phase-modulated carrier signal superimposed on a primary data communication signal that is sent between terminals of a free-space optical communication system. It should be understood that the communication system may employ separate transmitters and receivers, or may comprise transceiver units capable of communicating with other transceiver units, transmitters, receivers, or other system components. In practice, other modulation techniques, such as amplitude modulation or frequency modulation, may be implemented with a carrier signal in other embodiments. Other features of the present invention and the illustrated embodiments will be apparent to the reader from the foregoing and the appended claims, and as the ensuing detailed description and discussion is read in conjunction with the accompanying drawings.

Figure 1:
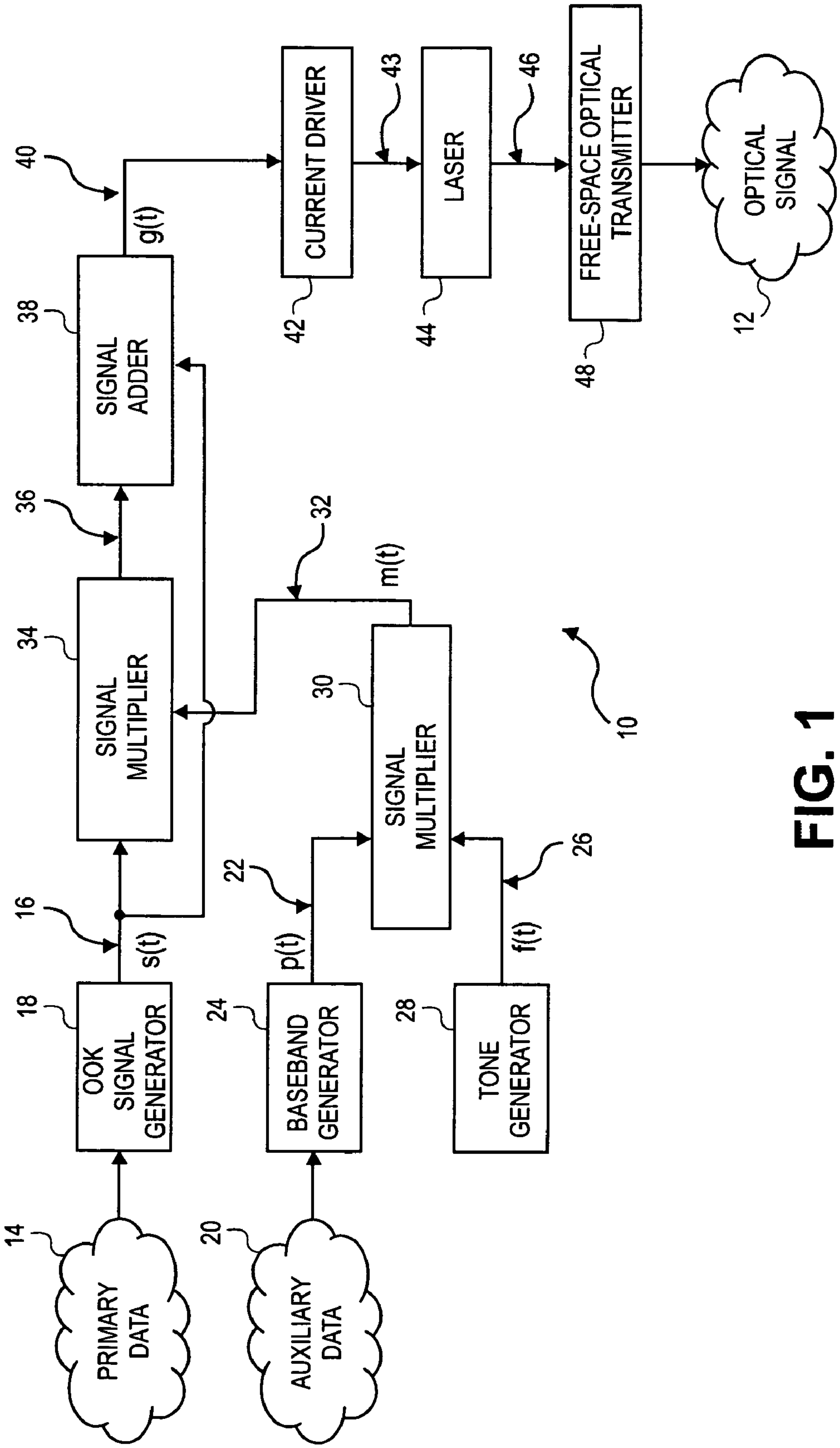
FIG. 1 is a block diagram illustrating communication electronics for generation and transmission of a phase-modulated auxiliary carrier tone superimposed on a data communication signal.
Figure 1D:
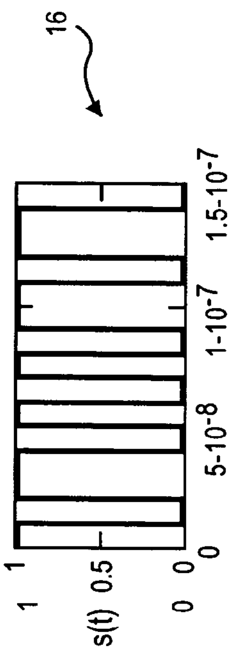
FIG. 1D is an illustration of an example primary digital OOK data signal.

Referring now to the drawings, and in particular to FIG. 1, there is illustrated a block diagram of communication electronics 10 for generation and transmission of a phase-modulated auxiliary carrier tone superimposed on a data communication signal. The process of generating and transmitting an optical signal 12, implemented by the communication electronics 10, begins with the encoding of a primary data set 14 into a primary digital OOK signal (designated as "s(t)") 16 by an OOK signal generator 18. The primary digital OOK signal 16 comprises a high speed signal in an embodiment, e.g., 1.25 Gbps, and may vary within the megaHertz or gigahertz range, for example. An example primary digital OOK signal 16 is illustrated in FIG. 1D. It should be noted at this point that the signal illustrated in FIG. 1D, as well as other signals illustrated in the figures and discussed throughout this specification are for illustrative purposes only and are not necessarily drawn to scale, and do not necessarily show an accurate representation of a combination of multiplied or added signals.

Figure 1E:
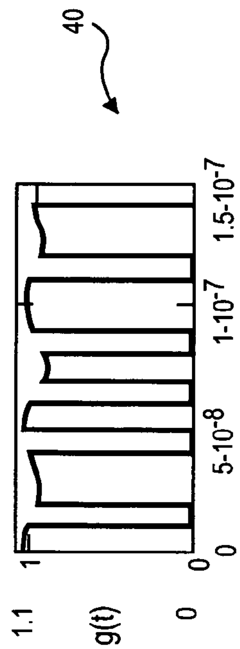
FIG. 1E is an illustration of an example primary digital OOK data signal with the phase-modulated auxiliary carrier tone of FIG. 1C superimposed thereon.
Figure 1A:
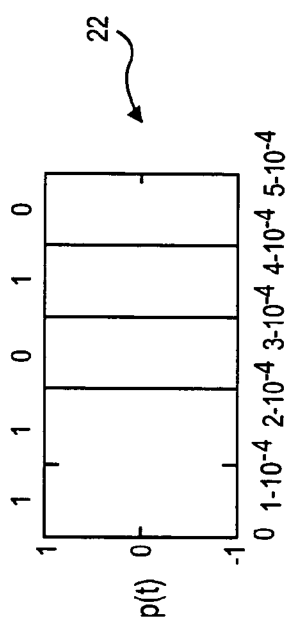
FIG. 1A is an illustration of an example auxiliary digital OOK data signal.
Figure 1B:
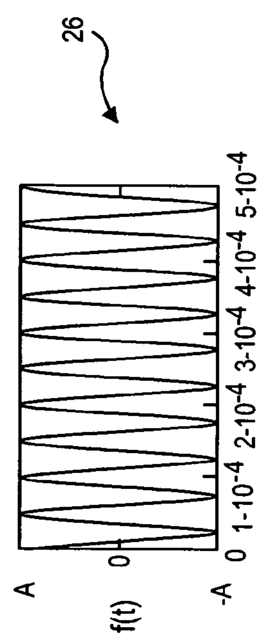
FIG. 1B is an illustration of an example auxiliary carrier tone.
Figure 1C:
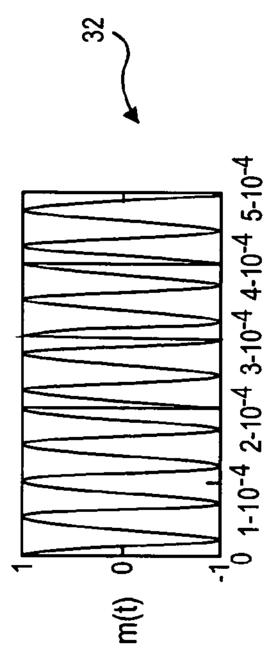
FIG. 1C is an illustration of an example phase-modulated auxiliary carrier tone.

In conjunction with the encoding of the primary data set 14, an auxiliary data set 20 is encoded into an auxiliary digital OOK signal (designated as "p(t)") 22 by a baseband generator 24 for subsequent combination with a carrier tone (designated as "f(t)") 26 produced by a tone generator 28, wherein $f(t)=A\cos(\omega_1 t)$. The auxiliary digital OOK signal has a lower data rate than the primary signal 16 in an embodiment, e.g., 10 kbps, and may vary within a frequency of 10 Hz to 100 kHz, for example. An example auxiliary digital OOK signal 22 and an example carrier tone 26 are illustrated in FIGS. 1A and 1B respectively. It should be noted that although a sinusoidal carrier signal is described and illustrated with reference to this embodiment of the present invention, other types of signals may be used, such as square waves, triangle waves, and the like in other embodiments of the invention. The auxiliary digital OOK signal 22 and the carrier tone 26 are combined in a first modulator circuit such as a first signal multiplier 30 to produce a phase-modulated carrier signal (designated as "m(t)") 32, wherein m(t)=p(t)f(t). An example phase-modulated carrier signal 32 is illustrated in FIG. 1C. The phase-modulated carrier signal 32 can be produced using phase-shift keying of a sinusoidal tone, in this case the carrier tone 26. Phase-shift keying transforms the auxiliary digital OOK signal 22 into the analog phase-modulated carrier signal 32. As indicated previously, other modulation techniques may also be utilized, including, but not limited to, amplitude-shift keying, frequency-shift keying, and the like.

The phase-modulated carrier signal 32 is then combined with the primary digital OOK signal 16 in a second modulator circuit such as a second signal multiplier 34, and a product signal 36 is input to a third modulator circuit such as a signal adder 38, wherein the product signal 36 is combined with the primary digital OOK signal 16 to produce a data communication signal (designated as "g(t)") 40 with the phase-modulated auxiliary carrier signal 32 superimposed thereon, wherein g(t)=s(t)[1+m(t)]. An example data communication signal 40 is illustrated in FIG. 1E. The primary digital OOK signal 16, added at the signal adder 38, may comprise any positive integer multiple of the primary digital OOK signal 16, e.g., 1, 2, 3 . . . n.

In addition, by choosing an amplitude A (see, e.g., FIG. 1B) for the carrier tone 26 that is within the range of 5–10 percent of the amplitude of the primary digital OOK signal 16 in an embodiment, the phase-modulated carrier signal 32, encoded with the auxiliary digital OOK signal 22, has a minimal effect on the primary digital OOK signal 16, as contained in the data communication signal 40, thereby ensuring that the primary high speed data is not compromised in the transmission process by the incorporation of lower-rate auxiliary data. Although a 5–10 percent modulation depth is used in one embodiment, it should be understood that higher or lower modulation depths may be used, depending on the particular application, on the sensitivity of the optical communication system to variations in peak amplitude, on the permissible amount of data loss or data distortion, or other considerations.

The generated data communication signal 40 is then input into a current driver 42 that drives a LASER 44 with a modulated signal 43 in the form of the data communication signal 40 to produce a modulated LASER output 46. The modulated LASER output 46 is directed through an optical fiber (not shown) to a free-space optical transmitter 48 to produce a modulated optical signal 12 representing the data communication signal 40 that includes the encoded information contained in the primary data set 14 and the auxiliary data set 20. The optical signal 12 may comprise LASER light in the range of 1550 nm, for example. An embodiment uses a balanced code with the OOK data communication signal 40 to prevent a long string of digital "0"s from suppressing the transmission of auxiliary communications.

Figure 2:
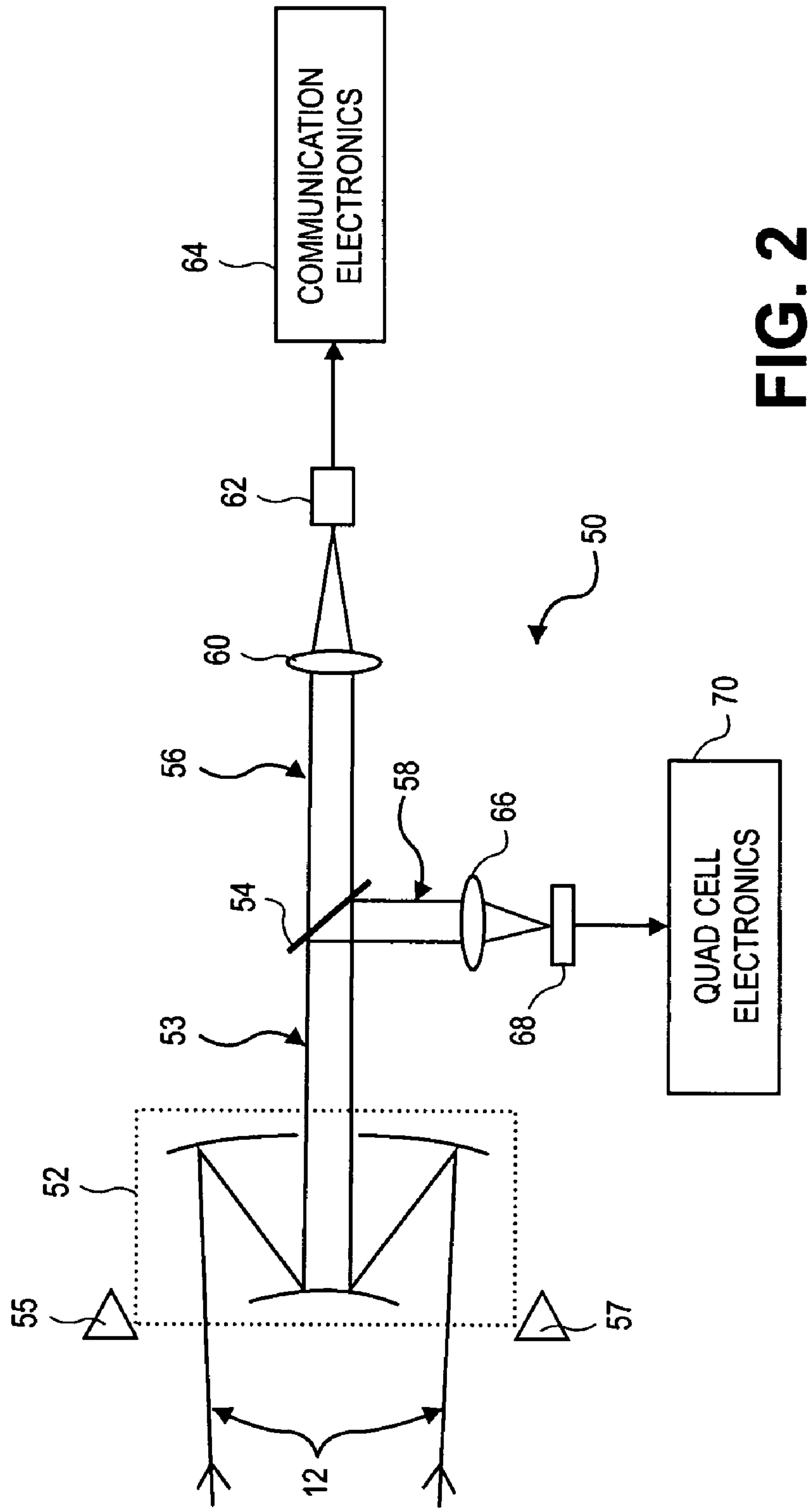
FIG. 2 is a pictorial block diagram illustration of an embodiment of a free-space optical receiver utilizing a quad cell detector.
Figure 3:
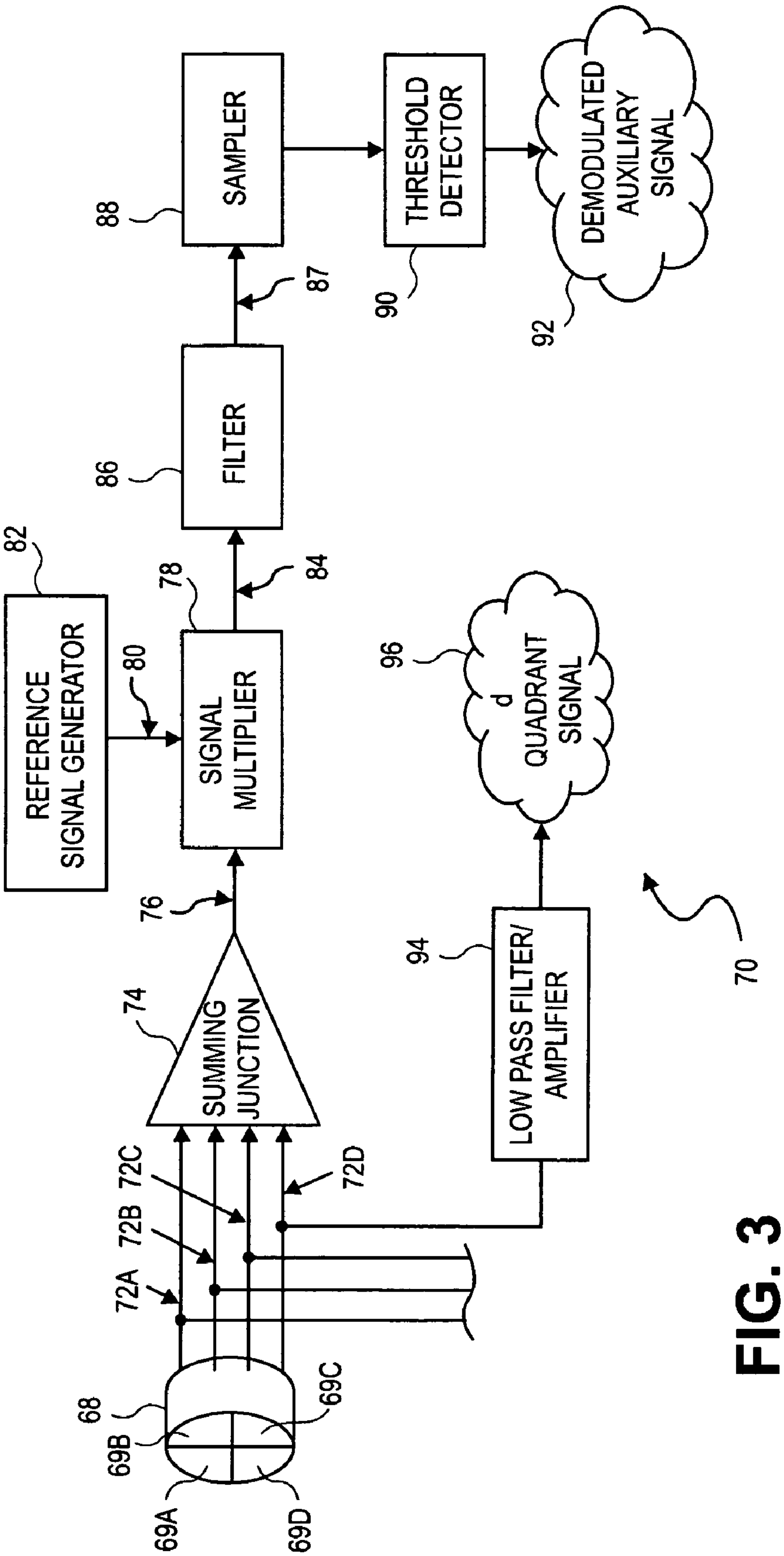
FIG. 3 is a block diagram illustrating an embodiment of quad cell electronics for the demodulation of the phase-modulated auxiliary carrier tone.

The operation of receiving components in accordance with embodiments of the invention may be understood upon reference to FIGS. 2 and 3. With reference first to FIG. 2, an embodiment of a free-space optical receiver utilizing a quad cell detector is illustrated generally at 50. The optical signal 12 is received by an optical element 52 which may be a typical arrangement of lenses and mirrors designed to collect and focus light to a single receiving point as will be apparent to one skilled in the art. In one embodiment, the optical element 52 includes a holographic optical element as described in commonly assigned U.S. patent Application Ser. No. 09/627,815, entitled SYSTEM AND METHOD FOR USING A HOLOGRAPHIC OPTICAL ELEMENT IN A WIRELESS TELECOMMUNICATION RECEIVER, filed Jul. 28, 2000, and incorporated herein by reference.

The optical signal 12 is collected and collimated by the optical element 52 to produce a collimated optical signal 53, which is directed to a beam splitter 54 that splits the collimated optical signal 53 into a first optical signal 56 and a second optical signal 58. The first optical signal 56 comprises approximately 90% of the collimated optical signal 53 in an embodiment. The first optical signal 56 is directed, via a primary focusing lens 60, to a high speed detector 62 that detects the first optical signal 56, and generates an electrical signal corresponding to the optical signal which is then input into communication electronics 64 for processing. The high speed detector 62 may be a typical InGaAs (indium-gallium-arsenic) detector, avalanche photodiode, PIN detector, or other detector suitable for the particular data speeds involved in a particular application. The processing of the signal detected by the high speed detector 62 is beyond the scope of this disclosure and will not be discussed in greater detail herein.

The second optical signal 58 comprises approximately 10% of the collimated optical signal 53 in an embodiment, but can vary with the percentage directed to the first optical signal 56. The second optical signal 58 is directed, via an auxiliary focusing lens 66, to a quad cell detector 68, or other detector that generates a plurality of electrical outputs that are then input to quad cell electronics 70 for demodulation of the encoded auxiliary data, illustrated generally in block diagram form in FIG. 3. Although a quad cell detector is illustrated in the present embodiment, other detectors, including single-cell detectors, or multiple-cell detectors having a plurality of cells (e.g., 6 or 8 cells), may also be utilized in other embodiments of the invention. A natural consequence of using the quad cell detector 68 is an increased field of view for detecting the optical signal 12 transmitted by the free-space optical transmitter 48 (see e.g., FIG. 1). This wider field of view is due to the larger (in comparison to the high speed detector 62) diameter of the quad cell detector 68, and provides an advantage useful for implementation of the illustrated embodiments. In the event that the pair of free-space terminals, between which the optical signal 56 is being transmitted, is not sufficiently aligned well enough for the high speed detector 62 to function, the wide field of view of the quad cell detector 68 permits the transmission of the auxiliary communication, which may include coordinated acquisition and tracking algorithms, or other system information that allows the system to function more effectively under the particular circumstances. Such a wide field of view may permit the system to function and realign itself even when the system is mis-pointed by several milli-radians.

Turning our attention now primarily to FIG. 3, the quad cell detector 68 is illustrated in conjunction with the quad cell electronics 70 for the demodulation of encoded auxiliary data. The quad cell detector 68 generates four electrical outputs 72*a–d*, one for each of the four cells 69*a–d* respectively, which are input into a summing junction 74, wherein the four signals 72*a–d* are combined to produce a single output signal 76. Each of the four electrical outputs 72*a–d* corresponds to the amount of the second optical signal 58 (see, e.g., FIG. 2) incident upon each respective cell 69*a–d* of the quad cell detector 68. The signals are summed by the summing junction 74 so that regardless of where the second optical signal 58 falls on the quad cell detector 68, there will always be an output signal 76 for input to a signal multiplier 78. For example, the second optical signal 58 may, due to a misalignment of the free-space optical terminals, be incident only on a single cell (69) of the quad cell detector 68. By summing the outputs 72_a–d_, an output signal 76 is ensured, and the strength of the incident second optical signal 58 is maintained.

The remainder of the quad cell electronics 70 leading to a demodulated auxiliary signal 92 represent the "coherent" electrical detection of the received optical signal 12, now represented by an output signal 76, and corresponding to the g(t) data communication signal 40 (see, e.g., FIGS. 1 and 1E). A brief explanation of the quad cell electronics 70, which may be implemented following any one of a number of detectors, is described herein. One skilled in the art will be capable of implementing a detection system based on this disclosure.

The output signal 76 is input into a third signal multiplier 78 that combines the output signal 76 with a reference signal (designated as "r(t)") 80, generated by a reference signal generator 82, to produce a referenced output 84. In an embodiment, the reference signal 80 comprises a tone with the same frequency ($r(t)=B\cos(\omega_1 t)$) as the carrier tone 26 (see e.g., FIGS. 1 & 1B) utilized for the phase-shift keying of the auxiliary digital OOK signal 22 described previously in conjunction with the communication electronics and FIG. 1 generally. By multiplying the detected data communication signal 40 (output signal 76) by the reference signal 80 having the same frequency ω as the carrier tone 26 element of the data communication signal 40, the referenced output 84 is generated that corresponds to the product $A\cdot B\cdot s(t)\cdot p(t)$, and has frequency components $2\omega_1$ and $\omega_1$.

The referenced output 84 is input into a filter 86 matched to the auxiliary digital OOK signal 22, and comprising a function $h(t)=p(T_0-t)$, which filters out the frequency components $2\omega_1$ and $\omega_1$ referred to above to produce an output signal 87 comprising $s(t)\cdot p(t)$, which may be an on/off keyed signal in an embodiment. The output signal 87 may be thought of as a p(t) signal "envelope" containing the higher frequency s(t) signal therein. A sampler 88 and a threshold detector 90 work in tandem to produce the demodulated auxiliary digital OOK signal 92. The sampler 88, wherein $T=n\cdot T_0$, and wherein $T_0$ is equal to the time size of each bit of the auxiliary digital OOK signal p(t) 22, samples each bit of the output signal 87, while the threshold detector acts like a regenerator, determining whether the signal level sampled by sampler 88 is above or below a specified threshold, and assigning a digital 0 or a digital 1 based on this condition. Where the sampled signal is above the specified threshold, a digital 1 is assigned, and where the sampled signal is below the threshold, a digital 0 is assigned. The reader will appreciate that the same demodulation technique described above could be implemented following the high speed detector 62 (see, e.g., FIG. 2).

In addition to demodulating the auxiliary digital OOK signal 92 to retrieve the auxiliary data 20 (see, e.g., FIG. 1), the four electrical outputs 72_a–d_ are each individually directed to a low-pass filter/amplifier 94 in an embodiment to produce a cell signal for each respective quadrant of the quad cell detector 68, for example, the d quadrant signal 96. Each cell signal (e.g.,. the d quadrant signal 96) provides an indication of the strength of the optical signal incident on that quadrant of the quad cell detector 68, which in turn provides an indication of the alignment between the transmitting terminal and the receiving terminal of the free-space optical communication system. Optimally, the optical signal will be centered on the quad cell detector 68 such that each respective quadrant 69_a–d_ receives an identical portion of the incident light (e.g., the second optical signal 58), and consequently produces an identical cell signal. Electronics (not illustrated) compares the four cell signals generated by the four respective quadrants 69_a–d_ of the quad cell detector 68, and provides relevant information to a steering mechanism (not shown) that can adjust the tracking and alignment of the terminals to provide a better communication channel for data transmission.

As an alternative or addition to using the quad cell detector 68, an embodiment of the present invention may utilize a plurality of separate detectors placed near or around the receive aperture of a free-space optical terminal. For example, FIG. 2 illustrates two such separate detectors at reference numerals 55 and 57. By providing a spaced arrangement of such detectors, the field of view could be made even wider than that effectuated by a quad cell. The detection mechanisms may also incorporate additional optics to increase light collection efficiency. The summing of signals could be done from each of the separate detectors in a manner similar to that done for the separate quadrants of the quad cell detector to provide the signal for demodulation and retrieval of the auxiliary data encoded therein.

Systems and methods for the communication of auxiliary data between terminals of a free-space optical communication link are disclosed herein. Illustrated embodiments describe the generation and transmission of auxiliary data by utilizing phase-modulation of an auxiliary carrier tone superimposed on a data communication signal.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method of auxiliary data communication between terminals in a free-space optical communication system, the method comprising:

generating an auxiliary data signal;

multiplying the auxiliary data signal with a carrier tone to produce a modulated carrier signal;

generating a primary data signal;

multiplying the primary data signal with the modulated carrier signal to produce a product signal, wherein the product signal is added to an integer multiple of the primary data signal to generate a data communication signal having the modulated carrier signal superimposed thereon;

transmitting the data communication signal as an optical signal from a first free-space optical terminal to a second free-space optical terminal;

receiving the data communication signal at the second free-space optical terminal via an optical element;

splitting the data communication signal into a first optical signal and a second optical signal;

detecting the first optical signal via a high speed detector and processing the first optical signal to retrieve the primary data signal;

detecting the second optical signal via a detector having a plurality of cells, the detector generating electrical outputs corresponding to the plurality of cells;

summing the electrical outputs from the detector to produce an output signal;

multiplying the output signal with a reference signal to produce a referenced signal;

filtering the referenced signal to produce an output signal comprising the auxiliary data signal and the primary data signal;

sampling the output signal to regenerate the auxiliary data signal; and passing each of the electrical outputs from the detector through a low-pass filter to generate a cell signal, wherein the cell signal corresponds to an amount of the second optical signal incident upon a corresponding cell of the detector.

2. A free-space optical communication system, comprising:

a first signal multiplier to modulate a carrier tone with an auxiliary data signal to produce a modulated carrier signal;

a second signal multiplier to combine the modulated carrier signal with a primary data signal to produce a product signal;

a signal adder to add the primary data signal to the product signal to produce a data communication signal with the modulated carrier signal superimposed thereon;

a first free-space optical terminal to transmit the data communication signal as an optical signal;

a second free-space optical terminal, including an optical element, to receive the optical signal comprising the data communication signal;

a beam splitter to split the optical signal into a first optical signal and a second optical signal;

a high speed detector to detect the first optical signal;

communication electronics to process the first optical signal to retrieve the primary data signal;

a multiple-cell detector for detecting the second optical signal, the multiple-cell detector comprising a plurality of cells that generate electrical outputs corresponding to the plurality of cells;

a summing junction to sum the electrical outputs generated by the plurality of cells of the multiple-cell detector to produce an output signal;

a third signal multiplier to combine the output signal with a reference signal to produce a referenced output;

a filter, matched to the auxiliary data signal, to filter the referenced output to produce an output signal comprising the primary data signal and the auxiliary data signal;

a sampler to sample the output signal;

a threshold detector to regenerate the auxiliary data signal; and a low pass filter to generate a cell signal from each of the electrical outputs generated by the multiple-cell detector.

3. A free-space optical terminal, comprising:

a first modulation circuit to modulate a carrier tone with an auxiliary data signal to produce a modulated carrier signal;

a second modulation circuit to combine the modulated carrier signal with a primary data signal to produce a product signal;

a third modulation circuit to add the primary data signal to the product signal to produce a data communication signal with the modulated carrier signal superimposed thereon; and a transmitter to transmit the data communication signal as an optical signal to a second free-space optical terminal capable of receiving the data communication signal.

4. A method of auxiliary data communication between terminals in a free-space optical communication system, the method comprising:

modulating a carrier tone with an auxiliary data signal to produce a modulated carrier signal;

superimposing the modulated carrier signal onto a primary data signal to generate a data communication signal, wherein the data communication signal comprises a sum of:

an integer multiple of the primary data signal, and a product signal comprising the modulated carrier signal and the primary data signal;

transmitting the data communication signal as an optical signal from a first free-space optical terminal to a second free-space optical terminal;

receiving the data communication signal at the second free-space optical terminal via at least one detector; and demodulating the data communication signal to retrieve the primary data signal and the auxiliary data signal.

5. The method of claim 4 wherein modulating the carrier tone with the auxiliary data signal includes phase-shift keying of the carrier tone.

6. The method of claim 4 wherein modulating the carrier tone with the auxiliary data signal includes amplitude-shift keying of the carrier tone.

7. The method of claim 4 wherein modulating the carrier tone with the auxiliary data signal includes frequency-shift keying of the carrier tone.

8. The method of claim 4 wherein the auxiliary data signal includes alignment information to acquire and maintain alignment between the first free-space optical terminal and the second free-space optical terminal.

9. The method of claim 4 wherein the auxiliary data signal includes transmit power control information.

10. The method of claim 4 wherein the auxiliary data signal includes link status information.

11. The method of claim 4 wherein the auxiliary data signal is coherently demodulated.

12. The method of claim 4 wherein the at least one detector includes a quad cell detector.

13. The method of claim 12 wherein the quad cell detector comprises four quadrants, and wherein a comparison of electrical outputs generated by the four quadrants is used to track the alignment between terminals in a free-space optical link.

14. The method of claim 4 wherein the at least one detector includes an InGaAs detector.

15. The method of claim 4 wherein the at least one detector includes a plurality of detectors located near a receive aperture of the second free-space optical terminal.

16. The method of claim 15 wherein the plurality of detectors are physically separated from one another and electrically connected.

17. The method of claim 4 wherein the auxiliary data signal has a lower frequency than the primary data signal.

18. The method of claim 17 wherein the primary data signal has a frequency within the megaHertz to gigaHertz range, and wherein the auxiliary data signal has a frequency in the range of about 10 Hertz to about 100 kiloHertz.

19. A free-space optical communication system, comprising:

a first free-space optical terminal to generate and transmit a data communication signal comprising a primary data signal having a modulated carrier signal superimposed thereon, wherein the modulated carrier signal comprises a carrier modulated by an auxiliary data signal and wherein the data communication signal comprises a sum of:

an integer multiple of the primary data signal, and a product signal comprising the modulated carrier signal and the primary data signal; and a second free-space optical terminal to receive, via at least one detector, and to demodulate the data communication signal to retrieve the primary data signal and the auxiliary data signal.

20. The system of claim 19 wherein the carrier is modulated with the auxiliary data signal via phase-shift keying.

21. The system of claim 19 wherein the carrier is modulated with the auxiliary data signal via amplitude-shift keying.

22. The system of claim 19 wherein the carrier is modulated with the auxiliary data signal via frequency-shift keying.

23. The system of claim 19 wherein the auxiliary data signal includes alignment information to acquire and maintain alignment between the first free-space optical terminal and the second free-space optical terminal.

24. The system of claim 19 wherein the auxiliary data signal includes transmit power control information.

25. The system of claim 19 wherein the auxiliary data signal includes link status information.

26. The system of claim 19 wherein the auxiliary data signal is coherently demodulated.

27. The system of claim 19 wherein the at least one detector includes a multiple-cell detector.

28. The system of claim 27 wherein the multiple-cell detector comprises four quadrants, and wherein a comparison of electrical outputs generated by the four quadrants is useable to track an alignment between the first and second free-space optical terminals in a free-space optical link.

29. The system of claim 19 wherein the at least one detector includes an InGaAs detector.

30. The system of claim 19 wherein the at least one detector includes a plurality of detectors located near a receive aperture of the second free-space optical terminal.

31. The system of claim 19 wherein the auxiliary data signal has a lower frequency than the primary data signal.

32. The system of claim 31 wherein the primary data signal has a frequency within the megaHertz to gigaHertz range, and wherein the auxiliary data signal has a frequency in the range of about 10 Hertz to about 100 kiloHertz.

* * * * *